United States Patent [19]

Levine

[11] 4,314,665

[45] Feb. 9, 1982

[54] ELECTRONIC THERMOSTAT

[76] Inventor: Michael R. Levine, 3605 Frederick Dr., Ann Arbor, Mich. 48105

[21] Appl. No.: 116,064

[22] Filed: Jan. 28, 1980

Related U.S. Application Data

[63] Continuation of Ser. No. 778,376, Mar. 17, 1977, Pat. No. 4,206,872.

[51] Int. Cl.$^3$ .................................................. F23N 5/20
[52] U.S. Cl. .................................... 236/46 R; 165/12
[58] Field of Search .............................. 236/46 R, 47; 340/309.1; 165/12; 364/500; 219/492; 62/157

[56] References Cited

U.S. PATENT DOCUMENTS

| | | | |
|---|---|---|---|
| 3,392,914 | 7/1968 | Nienstaedt | 236/46 R |
| 3,819,906 | 6/1974 | Gould, Jr. | 219/506 |
| 3,942,718 | 3/1976 | Palmieri | 236/78 R |
| 4,001,557 | 1/1977 | Stepenson | 236/46 R X |
| 4,079,366 | 3/1978 | Wong | 340/309.4 |

FOREIGN PATENT DOCUMENTS

1155432 6/1969 United Kingdom .
1193711 6/1970 United Kingdom .
1308552 2/1973 United Kingdom .

Primary Examiner—William E. Wayner
Attorney, Agent, or Firm—Krass, Young & Schivley

[57] ABSTRACT

A thermostat for generating control signals for a furnace, air conditioner, or the like, employs a constant frequency periodically alternating electrical source and an oscillator incorporating an element having a thermal-sensitive electrical characteristic so the oscillator frequency varies as a function of the ambient temperature. A comparator receives the two outputs and generates a signal representative of the ambient temperature. The stable output is also provided to dividing circuits to generate a signal representative of the time that is used to interrogate a digital memory storing a desired temperature-time program for the thermostat for a repetitive period, such as a week or month. The ambient temperature signal is compared with the desired temperature signal to generate an output conrol signal. A display provides a read-out of time and temperature and is used along with keyboard or the like in programming the memory.

14 Claims, 3 Drawing Figures

ELECTRONIC THERMOSTAT

This is a continuation of application Ser. No. 778,376, filed Mar. 17, 1977 now U.S. Pat. No. 4,206,872.

BACKGROUND OF THE INVENTION

1. Field of the Invention

This invention relates to an electronic thermostat for generating a temperature dependent control signal employing a digital, programmable memory time-temperature.

1. Prior Art

Thermostats which act to generate an electrical control signal for a furnace, air conditioning unit, or the like, typically employ a bimetal element which assumes a mechanical position dependent upon the ambient temperature. The desired temperature may be set into the device by moving an electrical contact with respect to the bimetal so that an output signal is provided when the ambient temperature reaches the set point. To allow this set point to be automatically varied over a 24-hour cycle, thermostats are available which incorporate clocks which mechanically adjust the thermostat set points at different times. When used in a residence to control a furnace this enables the temperature to be lowered during the night and at other times when the occupants are not normally home. These program devices typically allow a 24-hour period to be divided into two blocks of controllable length, and allow a differrent temperature setting for each block.

In view of the cost and reliability advantages of electronic circuitry, temperature sensing devices which employ an electronic element having electrical characteristics which vary as a function of temperature, used as a thermistor, are often employed in industrial devices. When used as thermostats, these devices are relatively complicated since they require circuitry for generating an analog voltage proportional to the set point and a comparator for receiving this analog voltage and the output of the temperature sensitive device. While it would be possible to add a 24-hour programming clock to this form of analog thermostat, the provision of a clock mechanism would probably obviate the advantages of the electronic temperature sensing elements over mechanical elements.

Independent of these developments in thermostats great cost reductions in digital electrical circuitry have taken place in recent years through the development of integrated circuits incorporating large numbers of digital devices on a single semi-conductor chip. Once the initial tooling costs for a specific integrated circuit have been amortized large quantities of complicated circuits may be produced at very low costs. These advances have been possible devices such as low cost electronic calculators and digital watches.

The present invention is broadly directed toward an electronic thermostat employing digital circuitry so that it may be mass-produced in the form of a low cost integrated circuit. Thermostats formed in accordance with the invention enjoy advantages over conventional thermostats in both cost and reliability and provide a variety of auxiliary functions which would be extremely expensive to implement in conventional mechanical or analog electronic thermostats.

SUMMARY OF THE INVENTION

The thermostat of the present invention broadly employs an oscillator incorporating an electronic element with properties which vary as a function of the ambient temperature so that the frequency of the oscillator varies with the temperature. The device also employs a circuit having a periodically varying output of constant frequency. This may take the form of a highly stable oscillator or the periodically varying signal may be derived from alternating current electric power lines.

The constant frequency signal is employed in two ways: first, it generates a time base which allows a signal which is a function of temperature to be derived from the output of the temperature sensitive oscillator, and second, it provides the input to a set of digital dividing counters which generate the signals. The time signals may include the year, month and day of the month as well as hour, minute and second. These time signals are use to interrogate a digital, programmable memory which stores a time-temperature sequence; i.e., a record of the desired temperature at each time within a repetitive period such as a day, week, month or year. The desired temperature signal derived from the memory by the time signal is then compared with the actual temperature signal and their differences are used to generate a control signal for the furnace, air conditioner or the like which may be either proportional or an on-off signal.

The occurrence of the output signal from the thermostat may be adjusted to compensate for the time required for the controlled device to affect the temperature at the thermostat; for example, if the desired temperature is 70° F. and the temperature sensed by the thermostat is dropping, the control signal to the furnace may go on at 70.5° F. This "compensation signal" may be adjustable and may be derived by the system as a function of the rate of change of temperature or on the basis of externally sensed factors such as temperature outside of the building.

The preferred embodiment of the system incorporates a decimal display which may display actual temperature, set point temperature, and/or time. These may be displayed continuously or on a sequential basis. The display may, for example, alternately flash the date, the time and the actual temperature. If an external temperature probe is used with the system the outside temperature could be similarly displayed.

The display is also used to program the time-temperature schedule in the memory through use of manual controls associated with the thermostat. The programming input device takes the form of a group of low-cost push-buttons of the type used with digital watches. One button switches the device between an operating mode and a set mode; another button selects the register to be incremented, i.e., present date, present time, future date, future time, temperature; a third button may be used to actually step these functions, which are then displayed, through various settings. The buttons or other manual control allow a particular start time and date to be inserted into the memory and displayed, and then allow a temperature for the period beginning at that time to be entered and displayed. Next the end time of one period and the beginning time of the next period and the desired temperature for that subsequent period are entered. This process is continued until the entire period of the control is covered. For example, a week may constitute a convenient cycle period. A relatively high temperature may be programmed into the memory for those periods during the week when the house is occupied and the occupants are normally awake, and lower temperatures may be programmed for the sleeping hours and when the house is unoccupied. The program may be designed to begin to warm up the house shortly before the occupants normally wake or before they return home.

The ability to program a full time cycle of temperatures lasting over long periods of time results in important energy savings through decreased use of fuel or power during periods when heating and cooling may be decreased without discomfort to occupants or inconvenience to commercial or industrial users.

Means may be provided for allowing a normal program to be retained but to be overriden by a programmed temperature for a specified period of time. For example, if the occupants are going to leave the house for the weekend they may program a lower temperature during that period with a warm-up cycle beginning shortly before they return. After this provisional period has been completed the control resumes its normal cycle.

Electrical power for the thermostat is preferably derived from an alternating current power source such as a 24 volt secondary coil of a transformer of the type used to power the fuel line solenoid of a furnace. The switching output of the thermostat is preferably connected in series with the load to be controlled across the power lines. When the switching output is open so that the controlled device is turned off, electric power for the control is available across the terminals of the switch. When the switch output is closed, energizing the called device, alternating current power for the thermostat may be developed across a small resistance connected in series with the controlled device and the power lines.

While it would be possible to derive an analog electrical signal having an amplitude which varies as a function of temperature from the variable frequency output of the temperature dependent oscillator without the use of some form of time base, the use of analog circuitry would tend to increase the complexity and expense of the thermostat over an all digital version. Derivation of a digital signal having a value representative of temperature inherently requires use of some form of time base with the variable frequency oscillator.

The preferred embodiment of the invention employs integrated semi-conductor circuits to implement all of the digital functions including the oscillator, time base, memory and the comparators. This circuitry may take the form of one or more integrated circuit chips with interconnections to the display, the temperature sensing element, a programming device and the output switch. The output switch may take the form of a solid state switch or hard contact. If a solid state switch is employed it may or may not be formed as part of the integrated circuit depending upon various economic and technical factors. The logic circuitry of the thermostat is preferably implemented with a suitable programmed microprocessor.

The cost of the present thermostat is comparable to that of an electronic calculator or a digital watch and is thus lower in cost than bimetal thermostats that it replaces despite the large number of additional functions that it performs.

Other objectives, advantages and applications of the present invention will be made apparent by the following:

Figure 1:
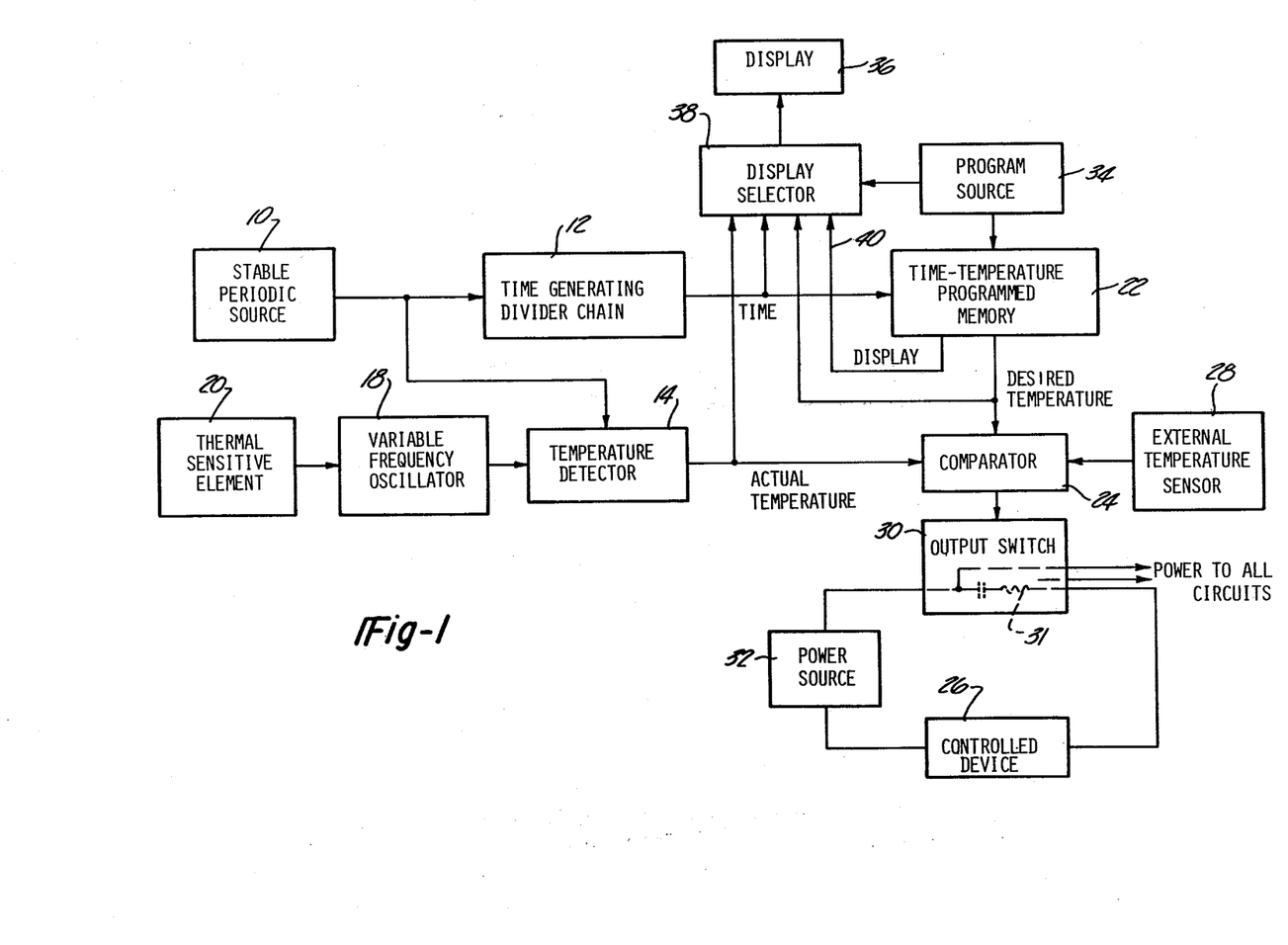
FIG. 1 is a block diagram of an electronic thermostat representing a preferred embodiment of the invention connected to a load so as to control the application of electrical power to the load.

Referring to FIG. 1, the preferred embodiment of the thermostat employs a stable periodic source 10. The source may constitute a stable oscillator, possibly employing a crystal, or it may take the form of a circuit which provides a periodically switching output using the alternating current power mains as a timing source, as will be subsequently described. The primary characteristic of the stable source 10 is that it is insensitive to the ambient temperature at the thermostat, at least over the normal operating range of the device. Its output constitutes a bi-valued electrical signal which periodically changes state. If the device is of the type that produces an analog varying output, such as a sinusoidal oscillator, appropriate wave shaping circuitry, such as a zero crossing detector, may be used to convert the signal into a bi-valued signal.

The output of the stable source 10 is provided to a dividing chain 12 which generates real time signals, i.e., output signals that change state each second, minute, hour, and day. In alternative embodiments of the invention the divider chains could provide additional signals which change state with the month and year, but the preferred embodiment of the invention operates on a one week cycle and accordingly no month or year signals are required. The dividing chain 12 may be of the type employed in digital clocks or watches.

The periodic source 10 also provides an output to a temperature detector circuit 14. Alternatively, the time base signal to the temperature detector could be derived from some stage of the divider chain 12.

The other input to the temperature detector 14 is from a variable frequency oscillator 18 which employs a thermal sensitive element 20. The element 20 is physically mounted on the thermostat so as to be subjected to ambient temperature. It has some electrical property that varies as a function of ambient temperature at least over the normal range of operation of the thermostat. For example, the temperature sensitive element 20 could constitute a thermistor connected across an electric power supply to provide a voltage to the oscillator 18 as a function of the ambient temperature on the thermostat. In that case the oscillator would be of the voltage controlled type and would provide a periodically varying output having a frequency dependent upon the ambient temperature. Alternatively, the element 20 could be connected in the tank circuit of the oscillator 18. Taken together, the oscillator 18 and the temperature sensitive element 20 constitute a temperature dependent frequency source.

The detector 14 uses the time base derived from the stable periodic source 10 to generate a temperature dependent digital signal from the outputs of the temperature dependent oscillator 18. The detector circuit may take a variety of forms, some of which will be subsequently described in detail. For example, the detector could employ counts to receive its two inputs and periodically compare their states, as by subtracting them, to generate a temperature dependent signal. Alternatively, one input could be used to increment a bi-directional counter and the other input used to decrement it. The contents of this counter could be examined at regular intervals and would constitute a temperature dependent signal.

The outputs of the time generating divider chain 12 are employed to interrogate a time-temperature programmed memory 22 to obtain a read-out from the memory of a desired temperature, for that time, which is stored in the memory. In the preferred embodiment of the invention the control operates on a one week cycle and the memory 22 stores desired temperature values for all times within a one week cycle. This desired temperature is provided to a comparator 24 which also receives the actual temperature from the detector 14. The comparator provides an output signal having a characteristic dependent upon these two inputs. The output signal may be a two-state signal having one value when the actual temperature is greater than the desired temperature, and the opposite value when the actual temperature is less than the desired value. Alternatively, the comparator 24 could generate a proportional output signal representative of the difference between the actual and the desired temperatures.

The comparator output could also be modified to consider such factors as the lag between the time the controlled device is energized and the time the temperature change actually reaches the thermostat; i.e., the comparator output could be adjusted to provide a switching output when the actual temperature is moving in the direction of the desired temperature but has not yet reached it. For example, if the controlled device 26 is a furnace, an output could be provided from the comparator when the actual temperature is decreasing and reaches a predetermined value above the temperature set point. Toward this end, the comparator 24 may have an input from an external temperature sensor 28 so that the degree of offset may be made a function of the difference between the actual temperature and the external temperature since the actual temperature will change at a rate dependent upon this difference. In alternative embodiments the comparator could employ circuitry to calculate the rate of change of actual temperature to adjust the lead factor. The output of the comparator 24 controls an output switch 30. Typically, the switch will be connected in series with an electrical power source 32 and the controlled load 26 so that the controlled device is energized when the output switch is closed. The output switch may employ make-and-break contacts, which may either be hard contacts or a solid state switch. When the comparator output is proportional the duty cycle of the output switch may be controlled to adjust the flow of power to the controlled device.

Power for the circuit is preferably obtained from the source 32 by tapping across the switch contacts when they are open, or across a series resistor 31 in the output circuit when the switch contacts are closed.

The program stored in the memory 22 is loaded in and modified by a suitable program source 34. In the preferred embodiment of the invention the program source takes the form of a keyboard containing numbers and commands but alternatively the program source could be push buttons of the type that are used in digital watches, thumb wheels, or the like.

A display device 36, preferably taking the form of a liquid crystal device, receives a binary signal from a display selector 38. In alternative embodiments of the invention the display device could take the form of light emitting diodes, a gas plasma display panel or the like. The display selector receives an actual temperature signal from the digital detector 14; a time signal from the divider chain 12; the desired temperature signal at the instant from the memory 22 and a general output from the memory 22 on line 40. During normal operation, the selector 38 provides signals to the display 36 which causes it to sequentially display the time, the actual temperature, and the desired temperature. Alternatively, other information such as the external temperature as generated by the sensor 28 could be displayed.

When the program source 34 is used to load or modify the memory 22, the display selector is controlled by the signal from the source 34 which causes it to display the information being provided to the memory from the source, as generated on line 40 from the memory. As particular information is entered into the source 34 by the programmer, it is shown on the display.

Figure 2:
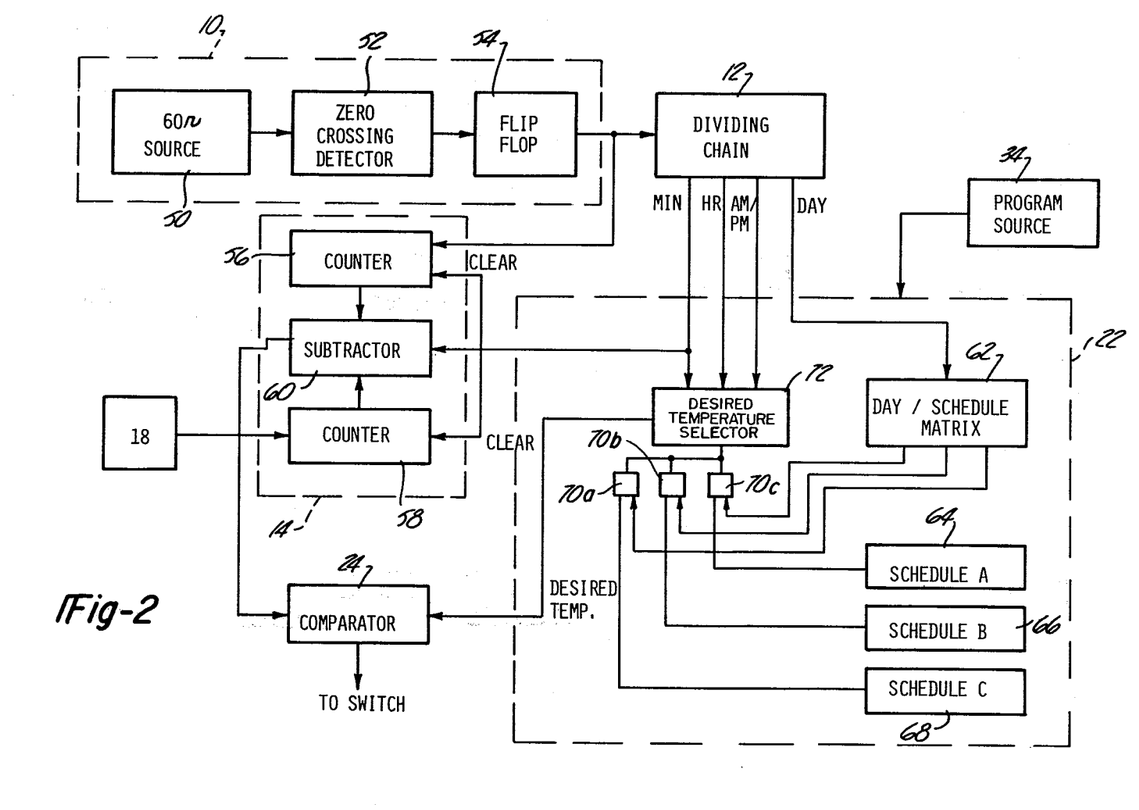
FIG. 2 is a more detailed partially schematic, partially block diargram of certain sections of the thermostat of FIG. 1.

Certain of the sections of the preferred embodiment of the thermostat are illustrated in more detailed block form in FIG. 2.

The stable periodic source 10 preferably takes the form of a 60 cycle source 50 feeding a zero-crossing detector 52. The zero-crossing detector provides an output pulse each time the 60 cycle source passes through zero. A flip-flop 54 converts the output of the zero crossing detector into a square wave form.

The outputs of the zero crossing detector are provided to the divider chain 12 which has outputs for minutes, hour, am/pm, and day.

The output of the flip-flop 54 is also provided to a counter 56 contained within the temperature detector 14. Similarly, the output of the variable frequency temperature dependent oscillator 18 is provided to another counter 58. The outputs of these two counters are provided to a subtractor unit 60 and subtraction is initiated at regular intervals by a signal on the minute output of the divider chain. This signal also clears the counters 56 and 58. Accordingly, once each minute the subtractor generates a signal equal to the difference between the frequencies of the stable and temperature source.

The time-temperature program memory 22 includes a random access memory which may be represented as containing four separate sections, a day/schedule matrix 62 and three schedule sections 64, 66 and 68. The schedule sections are each loaded with a complete 24 hour time-temperature cycle. A typical schedule might be: 12 am-7 am—65°; 7 am-9 am—70°; 9 am-5:30 pm—55°; 5:30 pm-11:30 pm—70°; 11:30 pm-12 am—65°. A typical schedule for a day when the home is to be unoccupied might be 12 am-12 am—55°.

Three such schedules are loaded into the memory sections 64, 66 and 68. In alternative embodiments additional schedule sections could be provided.

The day/schedule matrix is loaded with information as to which schedule is to be used on a particular day. For example, Monday-Friday night all involve schedule A; Saturday schedule B; and Sunday schedule C.

One particular schedule from the matrix 62 is selected by the "day" output of the divider chain 12. This causes the matrix 62 to energize one of three gates 70a, b or c to connect one of the thres schedules, 64, 66 or 68, to a temperature selector 72. The selector also receives the "minute", "hour" and "am/pm" outputs of the divider chain 12. It uses this time signal to interrogate the selected schedule to provide an output to the comparator 24 which represents the desired temperature at that time.

Alternate forms of program arrangement could be used in other embodiments of the invention. For example, the thermostat could be programmed on simply a daily basis or a monthly basis.

Figure 3:
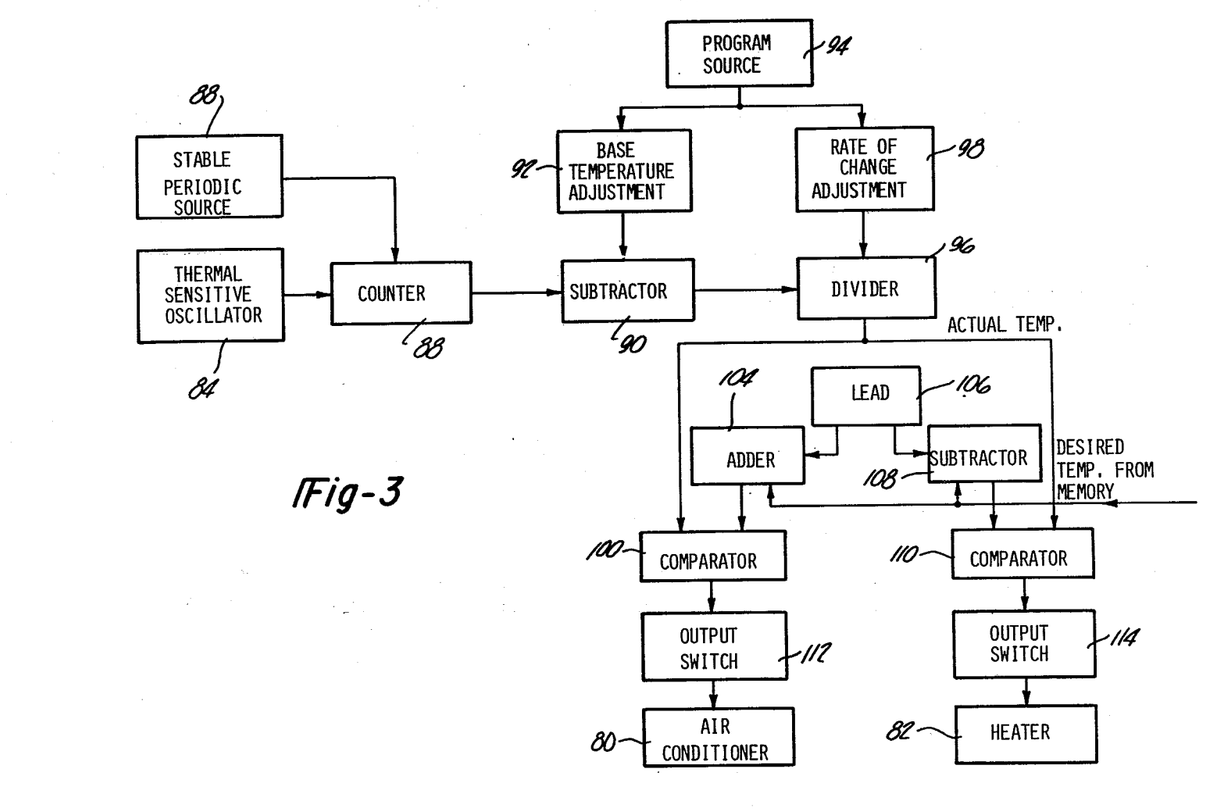
FIG. 3 is a block diagram of an alternative arrangement for portions of the thermostat of FIG. 1.

Certain alternative sections for the thermostat of FIG. 1 are illustrated in FIG. 3. These sections allow the thermostat to control a temperature system comprising an air cooler or conditioner 80 and an air heater 82 such as a furnace or the like. The alternative embodiment of the thermostat also provides programmable units for adjusting the temperature generating system to compensate for inaccuracies of the temperature dependent oscillator both as to base frequency and rate of change of frequency as a function of temperature.

The system employs a thermal sensitive oscillator 84. The frequency of this oscillator may be expressed as:

$$i\ f = kt + f_o$$

where:
- $f$ = observed frequency of oscillator;
- $t$ = temperature;
- $f_o$ = the fundamental frequency of the oscillator at a given temperature; and k is a constant.

Because of the manufacturing variances it may be necessary to compensate the oscillator by effectively adjusting the fundamental frequency and the constant. In order to achieve this the circuit of FIG. 3 provides the output of the oscillator 84 to a counter 86 and periodically clears the counter with a signal derived from a stable periodic source 88. The count contained in counter 86 each time it is cleared is provided to a subtractor 90 which also receives a digital number from a circuit 92 which stores a base temperature adjustment. The contents of the register 92 may be adjusted from a program source 94 either at the factory or in use.

The output of the subtractor 90 is fed through a divider 96 which divides the output of the subtractor by a signal from a register 98 containing a number which affects the rate of change of frequency as a function of temperature adjustment. The contents of the register 98 are likewise adjusted from the program source 84.

The output of the divider 96 provides an accurate measurement of actual temperature. Adjustments in the contents of the register 92 effectively adjust the fundamental frequency of the oscillator and adjustments in the register 98 modify the rate of change of the output signal to divider 96 as a function of temperature.

The output of the divider 96 is provided to a pair of comparators 100 and 102. The comparator 100 also receives the content of an adder 104 which adds a lead factor, stored in register 106, to the desired temperature signal as derived from memory 22 or a similar source. This lead factor may be 3° for example so that when the desired temperature is 70° the output of the adder 104 is a digital number representative of 73°. Similarly, the lead factor stored in register 106 is subtracted from the desired temperature signal in subtractor 108 which provides the remainder to another comparator 110. When the actual temperature is 70° and the lead factor is 3°, the subtractor 108 will output a digital signal representative of 67°.

When the actual temperature exceeds the output of the adder 104 a signal is provided to an output switch 112 causing the switch to close. The switch 112 actuates the air conditioner 80. Similarly, when the actual temperature signal from the divider 96 is less than the output of the subtractor 110, a signal is provided to an output switch 114 which controls the heater 82.

This system thus provides a dead zone equal to twice the value set in the register 106. When the temperature exceeds the top end of that dead zone the air condition is energized and when the actual temperature falls below the bottom of the dead zone the heater is energized.

In alternative embodiments of the invention separate lead factors could be provided for the air conditioner and the heater. The lead factor may be preset or programmable as from the program source 94.

The embodiments of the invention in which an exclusive property or privilege is claimed are defined as follows:

1. A thermostat for controlling the application of electrical power to a temperature modifying load, comprising: means for generating an electrical signal having a characteristic which varies as a function of the ambient temperature on the thermostat; a clock operative to generate digital electrical signals having values representative of real time over a repetitive cycle; a programmable, digital memory; means for loading said memory with a program of digital signals representative of desired temperatures for different times over said repetitive time cycle, circuitry for applying the output of the clock to the memory to generate a digital electric signal representative of the desired temperature at the instant time; means for receiving the electrical signal having a characteristic which is a function of ambient temperature and the output of the memory and for generating a control signal for said temperature modifying devices as a function of their differences.

2. The thermostat of claim 1 including a display device and means for connecting the display device to said electrical signal having a characteristic which varies as a function of ambient temperature and to the output of the clock.

3. The thermostat of claim 1 including manually operable means for programming said memory.

4. The thermostat of claim 1 wherein said clock comprises a digital divider chain driven by a periodically varying electrical signal having a frequency independent of the ambient temperature of the device.

5. The thermostat of claim 4 wherein said electrical signal having a characteristic which varies as a function of the ambient temperature on the thermostat comprises an oscillator having a temperature dependent element in its tank circuit.

6. The thermostat of claim 4 wherein said means for generating an electrical signal having a characteristic which varies as a function of the ambient temperature on the thermostat includes means for receiving said periodically varying signal and said electrical signal having a characteristic which varies as a function of the ambient temperature on the thermostat.

7. The thermostat of claim 1 wherein the electrical signal having a characteristic which varies as a function of the ambient temperature in the thermostat is digital.

8. A thermostat of claim 7 wherein the thermostat is formed as an integrated semi-conductor circuit.

9. The thermostat of claim 1 including a source of a constant frequency, periodically alternating electrical signal forming part of both said means for generating an electrical signal having a characteristic which varies as a function of the ambient temperature on the thermostat and said clock.

10. A thermostat for generating control signals for a temperature modifying device, comprising: means for generating a digital electrical signal representative of the ambient temperature on the thermostat; means for generating a digital electrical signal representative of the time within a repetitive time cycle; a programmable digital memory; means for loading said memory with a program of digital signals representative of desired temperatures for different times over said repetitive time cycle; circuit means for interrogating said memory with said digital time signal to generate a digital signal representative of the desired temperature at the existing time; and a comparator operative to receive the digital signal representative of the ambient temperature on the thermostat and the digital signal representative of the desired temperature, and to provide a control signal to said temperature modifying device.

11. The thermostat of claim 10 wherein said means for generating a digital electrical signal representative of the time within a repetitive time cycle includes means for generating a constant frequency periodically varying electrical signal, and said means for generating a digital electrical signal representative of the ambient temperature on the thermostat includes a temperature sensitive oscillator and means for receiving the output of the oscillator and the constant frequency signal.

12. The thermostat of claim 10 wherein said means for generating a digital time signal comprises an oscillator which has a constant frequency output at ambient temperatures over the range of the thermostat and a divider chain operative to receive the output of the oscillator.

13. The thermostat of claim 10 wherein said means for loading said memory with a program of desired temperatures for different times over a repetitive time cycle includes a manually operable keyboard.

14. The thermostat of claim 10 including digital means for modifying the output of the memory to generate a signal which is provided to the comparator in order to offset the temperature occurrence of the control signal with respect to the ambient temperature.

* * * * *

UNITED STATES PATENT AND TRADEMARK OFFICE
CERTIFICATE OF CORRECTION

PATENT NO. : 4,314,665
DATED : February 9, 1982
INVENTOR(S) : Michael R. Levine

It is certified that error appears in the above-identified patent and that said Letters Patent are hereby corrected as shown below:

On The Title Page,
  In The Abstract:

Line 15, "conrol" should be --control--.

Column 1, line 37, "used" should be --such--.
Column 1, line 58, "been" should be --made--.
Column 2, line 20, "use" should be --used--.
Column 5, line 66, "device" should be --display--.
Column 6, line 57, "night" should be --might--.
Column 6, line 63, "thres" should be --three-.
Column 7, line 17, "if = kt + $f_0$" should be --f = kt + $f_0$--.

Column 8, claim 8, line 1, "A" should read -- The --.

Signed and Sealed this

Sixth Day of July 1982

[SEAL]

Attest:

GERALD J. MOSSINGHOFF

Attesting Officer     Commissioner of Patents and Trademarks

Notice of Adverse Decision in Interference

In Interference No. 101,029, involving Patent No. 4,314,665, M. R. Levine, ELECTRONIC THERMOSTAT, final judgment adverse to the patentee was rendered Apr. 6, 1984, as to claims 1-4, 7, 8, 10 and 12-14.
[*Official Gazette April 1, 1986.*]

REEXAMINATION CERTIFICATE (1389th)

United States Patent [19]
Levine

[11] B1 4,314,665
[45] Certificate Issued  Dec. 4, 1990

[54] ELECTRONIC THERMOSTAT

[75] Inventor: Michael R. Levine, Ann Arbor, Mich.

[73] Assignee: Honeywell Inc., Minneapolis, Minn.

Reexamination Request:
No. 90/001,849, Sep. 27, 1989

Reexamination Certificate for:
Patent No.: 4,314,665
Issued: Feb. 9, 1982
Appl. No.: 116,064
Filed: Jan. 28, 1980

Certificate of Correction issued Jul. 6, 1982.

Related U.S. Application Data

[63] Continuation of Ser. No. 778,376, Mar. 17, 1977, Pat. No. 4,206,872.

[51] Int. Cl.$^5$ .............................................. F23N 5/20
[52] U.S. Cl. .................................... 236/46 R; 165/12
[58] Field of Search ..................... 374/170; 236/46 R

[56] References Cited

U.S. PATENT DOCUMENTS

| | | | |
|---|---|---|---|
| 3,622,994 | 11/1971 | Schoenwitz | 340/151 |
| 3,872,728 | 3/1975 | Joyce et al. | 374/170 |
| 3,882,928 | 5/1975 | Gazzo | 165/12 |
| 3,903,515 | 9/1975 | Haydon et al. | 340/309.4 |
| 3,942,718 | 3/1976 | Palmieri | 236/78 R |
| 3,964,676 | 6/1976 | Rooks et al. | 236/46 R |
| 3,964,677 | 6/1976 | Schalow et al. | 236/46 R |
| 3,978,325 | 8/1976 | Goldstein et al. | 235/151.3 |
| 3,979,059 | 9/1976 | Davis et al. | 236/46 R |
| 4,034,912 | 7/1977 | Hayes | 237/1 A |
| 4,054,246 | 10/1977 | Johnson | 237/1 A |
| 4,071,745 | 1/1978 | Hall | 236/46 R |
| 4,079,366 | 3/1978 | Wong | 340/309.4 |
| 4,110,827 | 8/1978 | Shavit | 165/22 X |
| 4,123,796 | 10/1978 | Shih | 165/22 X |
| 4,344,142 | 8/1982 | Diehr, II et al. | 364/473 |

FOREIGN PATENT DOCUMENTS

841601 of 1976 Belgium .

OTHER PUBLICATIONS

Snivley, *Energy Saving Applications for Computerized Automation*, ASHRAE, Transactions, Feb., 1974.
Nelson & Tobias, *Studies of Control Applications for Energy Conservation*, ASHRAE Transactions, Feb., 1974.
Shih, *Energy Conservation and Building Automation*, ASHRAE Transactions, Jan., 1975.
Johnson & Winn, *Smart Thermostats for Minimizing Energy Consumption*, Proceedings of Eighth Annual Simulation Symposium, Mar., 1975.
Edwards & Marshall, *Environmental Temperature Control*, The Heating and Air Conditioning Journal, Apr., 1975.
Winn & Hull, *Temperature Control for Solar Heating and Cooling of Buildings*, American Astronomical Society/AIAA Astrodynamics Special Conference, Jul. 1975.

*Primary Examiner*—William E. Wayner

[57] ABSTRACT

A thermostat for generating control signals for a furnace, air conditioner, or the like, employs a constant frequency periodically alternating electrical source and an oscillator incorporating an element having a thermal-sensitive electrical characteristic so the oscillator frequency varies as a function of the ambient temperature. A comparator receives the two outputs and generates a signal representative of the ambient temperature. The stable output is also provided to dividing circuits to generate a signal representative of the time that is used to interrogate a digital memory storing a desired temperature-time program for the thermostat for a repetitive period, such as a week or month. The ambient temperature signal is compared with the desired temperature signal to generate an output control signal. A display provides a read-out of time and temperature and is used along with keyboard or the like in programming the memory.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6, 9 and 11 is confirmed.

Claims 1-5, 7, 8, 10 and 12-14 are cancelled.
New claims 15-27 are added and determined to be patentable.

15. *A thermostat for controlling the application of electrical power to a temperature modifying load, comprising:*
   *(a) means for generating a first electrical signal having a characteristic which varies as a function of the ambient temperature of the thermostat;*
   *(b) a clock operative to generate digital electrical signals having values representative of real time over a repetitive cycle, said clock comprising a digital divider chain driven by a periodically varying electrical signal having a frequency independent of the ambient temperature of the device;*
   *(c) means for generating a digital electrical signal which varies as a function of ambient temperature, comprising means for receiving both said periodically varying signal and said first electrical signal having a characteristic which varies as a function of ambient temperature;*
   *(d) a programmable, digital memory;*
   *(e) means for loading said memory with a program of digital signals representative of desired temperatures for different times over said repetitive time cycle;*
   *(f) circuitry for applying the output of the clock to the memory to generate a digital electrical signal representative of the desired temperature at the instant time; and*
   *(g) means for receiving the digital electrical signal having a characteristic which is a function of ambient temperature and the output of the memory and for generating a control signal for said temperature modifying device as a function of their differences.*

16. *A thermostat for controlling the application of electrical power to a temperature modifying load, comprising:*
   *(a) means for generating an electrical signal having a characteristic which varies as a function of the ambient temperature of the thermostat;*
   *(b) a clock operative to generate digital electrical signals having values representative of real time over a repetitive cycle;*
   *(c) a source of constant frequency, periodically alternating electrical signal forming part of both said means for generating an electrical signal having a characteristic which varies as a function of the ambient temperature on the thermostat and said clock;*
   *(d) a programmable, digital memory;*
   *(e) means for loading said memory with a program of digital signals representative of desired temperatures for different times over said repetitive time cycle;*
   *(f) circuitry for applying the output of the clock to the memory to generate a digital electrical signal representative of the desired temperature at the instant time; and*
   *(g) means for receiving the electrical signal having a characteristic which is a function of ambient temperature and the output of the memory and for generating a control signal for said temperature modifying device as a function of their differences.*

17. *A thermostat for generating control signals for a temperature modifying device, comprising:*
   *(a) means for generating a digital electrical signal representative of the time within a repetitive time cycle, said means including means for receiving a constant frequency periodically varying electrical signal;*
   *(b) means for generating a digital electrical signal representative of the ambient temperature on the thermostat, said means comprising a temperature sensitive oscillator and means for receiving both the output of the oscillator and the constant frequency signal;*
   *(c) a programmable digital memory;*
   *(d) means for loading said memory with a program of digital signals representative of desired temperatures for different times over said repetitive time cycle;*
   *(e) circuit means for interrogating said memory with said digital time signal to generate a digital signal representative of the desired temperature at the existing time; and*
   *(f) a comparator operative to receive the digital signal representative of the ambient temperature on the thermostat and the digital signal representative of the desired temperature, and to provide a control signal to said temperature modifying device.*

18. *A thermostat as in claim 15, in which:*
   *(a) said first electrical signals is a temperature-sensitive periodic analog electrical signal having a frequency that varies as a function of the ambient temperature;*
   *(b) said periodically varying electrical signal having a frequency independent of the ambient temperature on the device is a constant-frequency analog electrical signal; and*
   *(c) said means for generating a digital electrical signal which varies as a function of ambient temperature comprises frequency-comparison means for comparing a count of the frequency of said temperature-sensitive periodic analog electrical signal with a count of the frequency of said constant-frequency analog electrical signal.*

19. *A thermostat as in claim 18, in which said frequency-comparison means includes means for periodically performing a subtraction operation using as operands a count of the temperature-sensitive frequency and a count of the constant frequency.*

20. *A thermostat as in claim 18, in which said frequency-comparison means includes a bi-directional counter that counts both said temperature-sensitive frequency and said constant frequency in opposite directions.*

21. *A thermostat as in claim 17 in which the means for generating a digital electrical signal representative of the ambient temperature includes count-comparison means for comparing a count of the frequency of the constant frequency electrical signal and a count of the frequency of the temperature-sensitive oscillator.*

22. *A thermostat as in claim 21, in which said count-comparison means includes means for periodically per-* forming a subtraction operation using as operands a count of said temperature-sensitive frequency and a count of the constant frequency.

23. A thermostat as in claim 21, in which said count-comparison means includes a bi-directional counter that counts both said temperature-sensitive frequency and said constant frequency in opposite directions.

24. A thermostat for controlling the application of electrical power to a temperature modifying load comprising:
   (a) means for receiving a constant-frequency electrical signal having a constant, periodic frequency;
   (b) means for generating a temperature-sensitive electrical signal having a frequency which varies as a function of ambient temperature;
   (c) means for generating a digital electrical signal representative of the ambient temperature comprising:
      (1) a first digital counter for counting the frequency of the constant-frequency electrical signal;
      (2) a second digital counter for counting the frequency of the temperature-sensitive electrical signal; and
      (3) a digital subtractor for performing a subtraction operation using the counts of the first and second counters as operands;
   (d) a clock for generating digital electrical signals representative of real time over a repetitive time cycle, the clock comprising a digital divider chain driven by the first electrical signal;
   (e) a programmable, digital memory;
   (f) means for loading said memory with a program of digital signals representative of different temperatures for different times over said repetitive time cycle;
   (g) circuitry for applying the output of the clock to the memory to generate a digital electrical signal representative of the desired temperature at the instant time; and
   (h) means for receiving the digital electrical signal which is representative of the ambient temperature and the output of the memory and for generating a control signal for the temperature modifying device as a function of their difference.

25. A thermostat for controlling the application of electrical power to a temperature modifying load comprising:
   (a) a source of a periodically alternating electrical signal whose frequency is constant at ambient temperatures over the range of the thermostat;
   (b) a source of a periodically alternating electrical signal whose frequency varies as a function of the ambient temperature on the thermostat, said variation being measured from a base frequency at a base temperature;
   (c) a counter for periodically generating a digital count representative of the difference between the current value of said temperature-variable frequency and the base frequency;
   (d) means for adjusting said digital count to derive a digital signal representative of the ambient temperature on the thermostat;
   (e) a clock utilizing an output from said source of a constant frequency signal to generate digital electrical signals representative of real time over a repetitive time cycle;
   (f) a programmable, digital memory;
   (g) means for loading said memory with a program of digital signals representative of different temperatures for different times over said repetitive time cycle;
   (h) circuitry for applying the output of the clock to the memory to generate a digital electrical signal representative of the desired temperature at the instant time; and
   (i) means for receiving the digital electrical signal which is representative of the ambient temperature and the output of the memory and for generating a control signal for the temperature modifying device as a function of their difference.

26. The thermostat of claim 25, in which said means for adjusting said digital count includes means for subtracting a base-temperature adjustment number from the digital count.

27. The thermostat of claim 26, in which said means for adjusting said digital count includes means for dividing (i) the result of subtracting a base-temperature adjustment number from the digital count, by (ii) a digital temperature-slope adjustment member.

* * * * *

REEXAMINATION CERTIFICATE (2383rd)

United States Patent [19]
Levine

[11] B2 4,314,665
[45] Certificate Issued Sep. 13, 1994

[54] ELECTRONIC THERMOSTAT

[75] Inventor: Michael R. Levine, Ann Arbor, Mich.

[73] Assignee: Honeywell Inc., Del.

Reexamination Request:
No. 90/002,244, Dec. 17, 1990

Reexamination Certificate for:
Patent No.: 4,314,665
Issued: Feb. 9, 1982
Appl. No.: 116,064
Filed: Jan. 28, 1980

Related U.S. Application Data

[63] Continuation of Ser. No. 778,376, Mar. 17, 1977, Pat. No. 4,206,872.

Certificate of Correction issued Jul. 6, 1982.

[51] Int. Cl.$^5$ ............................................. F23N 5/20
[52] U.S. Cl. ....................................... 236/46 R; 165/12
[58] Field of Search .................. 165/12; 236/46 R; 364/557

[56] References Cited

U.S. PATENT DOCUMENTS

| | | | |
|---|---|---|---|
| 2,832,870 | 4/1958 | Kucera | 236/46 X |
| 3,392,914 | 7/1968 | Nienstaedt | 236/46 R |
| 3,819,900 | 6/1974 | Gould, Jr. | 219/506 |
| 3,942,718 | 3/1976 | Palmieri | 236/78 R |
| 4,001,557 | 1/1977 | Stepenson | 236/46 R |
| 4,079,366 | 3/1978 | Wong | 340/309.4 |
| 4,106,690 | 8/1978 | Tomlinson | 236/46 R |
| 4,200,910 | 4/1980 | Hall . | |
| 4,771,392 | 9/1988 | Hall . | |
| 4,967,382 | 10/1990 | Hall . | |

FOREIGN PATENT DOCUMENTS

| | | |
|---|---|---|
| 1155432 | 6/1969 | United Kingdom . |
| 1193711 | 6/1970 | United Kingdom . |
| 1308552 | 2/1973 | United Kingdom . |

OTHER PUBLICATIONS

Instruments & Control Systems, Jun. 1976, Eugene Murphy pp. 35–38.
Operating System Description Re Delta 2500/L6 and Delta 2000 (Bates Nos. HW 0032362–HW 0032501) No date.
Diagram of Honeywell Part Number 14500406 (Bates No. HW 0031610) Apr. 1970.
Honeywell's Operator's Manual for the Delta 2000 Form No. 77-6428, pp. 1–30 (Bates Nos. HW 0031203–HW 0031232) no date.
Honeywell document "Alpha/Delta Data Gathering Panel" (Series 1000, Form No. 74-1721 (Bates Nos. HW 0030795–HW 0030796) no date.
Honeywell document "Central Processor Unit" (Model Number W1000A, B), Form No. 74-1700 (Bates Nos. HW 0030757–HW 0030758) Jun. 1976.
Honeywell document "DELTA Systems Temperature-Pulse Transmitters", Form No. 74–1846, (Bates Nos. HW 0031743–HW 0031746) Jun. 1986.
Honeywell document "Operator's Manual ALPHA/-DELTA 1000 General Aug. 1976 Information", Form No. 77-6462 (Bates Nos. HW 0031691–HW 0031734).
Johnston Controls document "Software Configurator JC80 Supply Air Reset" JC/80/55, SSG–5052–Supply Air Reset, pp. 5052-01-5052-09 no date.
Johnson Controls document "Software Library JC Programmed Start/Stop Commands", (Bates Nos. HW 0028917–HW 0028925) no date.
Declaration of John M. Lahr, dated Oct. 21, 1992, pp. 1–4 including 1–page diagram for Delta 2500 System.
Declaration of Nick Bello, dated Oct. 22, 1992, pp. 1–6, including 1–page diagram for Delta 2000 System and 1–page diagram for Delta 1000 System.
Letter dated Aug. 31, 1992, addressed to Michael O. Sutton from Thomas G. Scavone, pp. 1–3, with attachments bearing Bates Nos. HW 0028838–HW 0028840, HW 0028892–HW 0028897, HW 0028911–HW 0028910, HW 0029413–HW 0029418, HW 0028915–HW 0028925, HW 0025699–HW 0025714, and HW 0024402–HW 0024498.
Letter dated Sep. 24, 1991, addressed to Thomas G. Scavone from Michael O. Sutton, pp. 1–5.
Modern Electronics Circuits Reference Manual, p. 1058, 1063 (McGraw Hill 1980).
("Thermistor–voltage controlled oscillator networks"[sic]) Radio Electronics, p. 38, Jun., 1968.
Bulletin CA–125 Temperature Compensation with sensitor (R) Resistors (Texas Instruments, Inc., Dallas, Tex., Mar. 1969).

("Thermistor-voltage controlled oscillator networks" [sic]) Electronic Design, p. 160, Mar. 15, 1974.

*Primary Examiner*—William E. Wayner

[57] ABSTRACT

A thermostat for generating control signals for a furnace, air conditioner, or the like, employs a constant frequency periodically alternating electrical source and an oscillator incorporating an element having a thermal-sensitive electrical characteristic so the oscillator frequency varies as a function of the ambient temperature. A comparator receives the two outputs and generates a signal representative of the ambient temperature. The stable output is also provided to dividing circuits to generate a signal representative of the time that is used to interrogate a digital memory storing a desired temperature-time program for the thermostat for a repetitive period, such as a week or month. The ambient temperature signal is compared with the desired temperature signal to generate an output conrol signal. A display provides a read-out of time and temperature and is used along with keyboard or the like in programming the memory.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9, 16, 19, 20 and 22–27 is confirmed.

Claims 1–5, 7, 8, 10 and 12–14 were previously cancelled.

Claims 6, 11, 15 and 17 are cancelled.

Claims 18 and 21 are determined to be patentable as amended.

18. A thermostat [as in claim 15, in which:] *for controlling the application of electrical power to a temperature modifying load, comprising:*
   (a) *means for generating a first electrical signal having a characteristic which varies as a function of the ambient temperature of the thermostat;*
   (b) *a clock operative to generate digital electrical signals having values representative of real time over a repetitive cycle, said clock comprising a digital divider chain driven by a periodically varying electrical signal having a frequency independent of the ambient temperature of the device;*
   (c) *means for generating a digital electrical signal which varies as a function of ambient temperature, comprising means for receiving both said periodically varying signal and said first electrical signal having a characteristic which varies as a function of ambient temperature;*
   (d) *a programmable, digital memory;*
   (e) *means for loading said memory with a program of digital signals representative of desired temperatures for different times over said repetitive time cycle;*
   (f) *circuitry for applying the output of the clock to the memory to generate a digital electrical signal representative of the desired temperature at the instant time; and*
   (g) *means for receiving the digital electrical signal having a characteristic which is a function of ambient temperature and the output of the memory and for generating a control signal for said temperature modifying device as a function of their differences;*
   (h) in which:
      [(a)](*1*) said first electrical signal is a temperature-sensitive periodic analog electrical signal having a frequency that varies as a function of the ambient temperature;
      [(b)](*2*) said periodically varying electrical signal having a frequency independent of the ambient temperature on the device is a constant-frequency analog electrical signal; and
      [(c)](*3*) said means for generating a digital electrical signal which varies as a function of ambient temperature comprises frequency-comparison means for comparing a count of the frequency of said constant frequency analog electrical signal.

21. A thermostat [as in claim 17] *for generating control signals for a temperature modifying device, comprising:*
   (a) *means for generating a digital electrical signal representative of the time within a repetitive time cycle, said means including means for receiving a constant frequency periodically varying electrical signal;*
   (b) *means for generating a digital electrical signal representative of the ambient temperature on the thermostat, said means comprising a temperature sensitive oscillator and means for receiving both the output of the oscillator and the constant frequency signal;*
   (c) *a programmable digital memory;*
   (d) *means for loading said memory with a program of digital signals representative of desired temperatures for different times over said repetitive time cycle;*
   (e) *circuit means for interrogating said memory with said digital time signal to generate a digital signal representative of the desired temperature at the existing time; and*
   (f) *a comparator operative to receive the digital signal representative of the ambient temperature on the thermostat and the digital signal representative of the desired temperature, and to provide a control signal to said temperature modifying device;*
   (g) in which the means for generating a digital electrical signal representative of the ambient temperature includes count-comparison means for comparing a count of the frequency of the constant frequency electrical signal and a count of the frequency of the temperature-sensitive oscillator.

* * * * *